(12) United States Patent
Huddleston

(10) Patent No.: US 6,513,457 B2
(45) Date of Patent: Feb. 4, 2003

(54) CATCH'EM FLEA BRUSH

(75) Inventor: Thomas Mitchell Huddleston, 10450 Cimmeron Trail Dr., Adelanto, CA (US) 92301-2215

(73) Assignee: Thomas Mitchell Huddleston, Adelanto, CA (US)

( * ) Notice: Subject to any disclaimer, the term of this patent is extended or adjusted under 35 U.S.C. 154(b) by 0 days.

(21) Appl. No.: 09/781,088

(22) Filed: Jan. 12, 2001

(65) Prior Publication Data

US 2001/0037772 A1 Nov. 8, 2001

Related U.S. Application Data

(60) Provisional application No. 60/174,239, filed on Feb. 22, 2000.

(51) Int. Cl.[7] .......................... A01K 13/00; A01K 29/00
(52) U.S. Cl. .......................... 119/626; 119/664; D4/132
(58) Field of Search ................................ 119/625, 626, 119/664; 132/121, 141, 142, 159; 15/104.002, 159.1; D28/10, 21; D4/132, 134, 138

(56) References Cited

U.S. PATENT DOCUMENTS

| 621,917 | A | * | 3/1899 | Hippisley | 15/159.1 |
| 1,626,415 | A | * | 4/1927 | Koske | 132/121 |
| D127,983 | S | * | 7/1941 | Wechsler | D4/134 |
| 5,148,571 | A | * | 9/1992 | Brazis et al. | 15/104.002 |
| D358,489 | S | * | 5/1995 | Balster et al. | D4/134 |
| D359,624 | S | * | 6/1995 | Dols | D4/134 |
| 5,878,457 | A | * | 3/1999 | Cox et al. | 15/104.002 |
| 6,257,172 | B1 | * | 7/2001 | Leppenan | 119/664 |

* cited by examiner

Primary Examiner—Charles T. Jordan
Assistant Examiner—Elizabeth Shaw

(57) ABSTRACT

A flea brush adapted to insert sticky paper, brush lead having four sides the fourth of which is integral with the handle, ridges running continuously along the four sides proximity, hollow head, having bristles at bottom to brush the fur or hair of an animal through the action of brushing alone, having a handle and a head, the head having a bottom with slots, and bridges, a living hinge attaching top to head. When in use the bristles trap fleas or insects in the slots on the sticky paper.

2 Claims, 5 Drawing Sheets

CATCH'EM FLEA BRUSH

CROSS-REFERENCE TO RELATED APPLICATIONS

The prior application No. 60/174,239 Catch'em Flea Brush the present invention the head of this brush incorporates a top with a living hinge, with a snap. The bottom of brush head has four sides, hollow, bristles, and slots, with extended handle.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

The present invention is a flea brush with sticky paper inside brush head. It's different from powder dispensing brushes, this brush catches fleas or insects onto the sticky paper as the hair or fur of the animal is being brushed.

2. Description of the Prior Art

Many devices known in the art are adapted to dispense pesticides such as flea powder into the fur or hair of a domestic animal during brushing or grooming. The following U.S. Patents exemplifies such brushes and combs. U.S. Pat. No. 4,815,232 Rawski, discloses a device to capture living insects and other debris when combing an animal's coat. It consists of a comb with a sheath attached whereby the coat is combed between the sheath and the comb's teeth. On the inside of the sheath is a dimpled structure containing an adhesive within each dimple. As the animal's coat is combed living insects tend to escape the coat and get caught on the adhesive inside one of the dimples. The dimpled structure may be easily removed when filled with insects and replaced with a fresh one.

U.S. Pat. No. 5,823,145 Hingiss, discloses a pet flea brush for simultaneously grooming and spraying a pet for fleas. The brush generally comprises a head portion, a handle portion, a plurality of bristles projecting from the head, a plurality of nozzles between the bristles, a fluid chamber, a pump dispenser in the brush, and a trigger which engages the pump and is accessible to the user for activating the pump. A number of U.S. patents disclose powder-dispensing brushes, which employ hollow bristles or other kinds of projections with ports through which powder is dispensed, most notably including U.S. Pat. No. 6,762,433, Cary; U.S. Pat. No. 3,995,597 Warwick, and U.S. Pat. No. 4,237,822, Kaiser.

Finally, U.S. Pat. No. 4,143,982, Cox, discloses a dispensing brush tray with an upraised rim and a bottom with discontinuous longitudinal slots and projecting bristles. Sliding attached to the tray is a powder container having a bottom with cross-slots aligns with the slots in the tray. By manually moving the container relative to the tray while brushing an animal, powder may be controllably dispensed.

The present invention allows the user to catch fleas or insects while brushing the fur or hair of an animal. Unlike devices in the prior art, no act or movement other than brushing is needed to bring the fleas or insects from the skin to the fur or hair of the animal to be trapped into the head of the brush.

BRIEF SUMMARY OF THE INVENTION

Accordingly, the present invention provides a flea brush, with sticky paper inside head. This is achieved by providing a brush which, in it's preferred embodiment has a handle and a head, the head being hollow and having a top, a bottom, and four sides, the fourth of which is integral with a handle.

The bottom of the brush head has a multitude of bristles preferably composed of polypropylene with slots between the bristles. The bottom has four sides, hollow to insert sticky paper with top having a living hinge.

BRIEF DESCRIPTION OF SEVERAL VIEW OF THE DRAWING

DETAILED DESCRIPTION OF THE INVENTION

Figure 1:
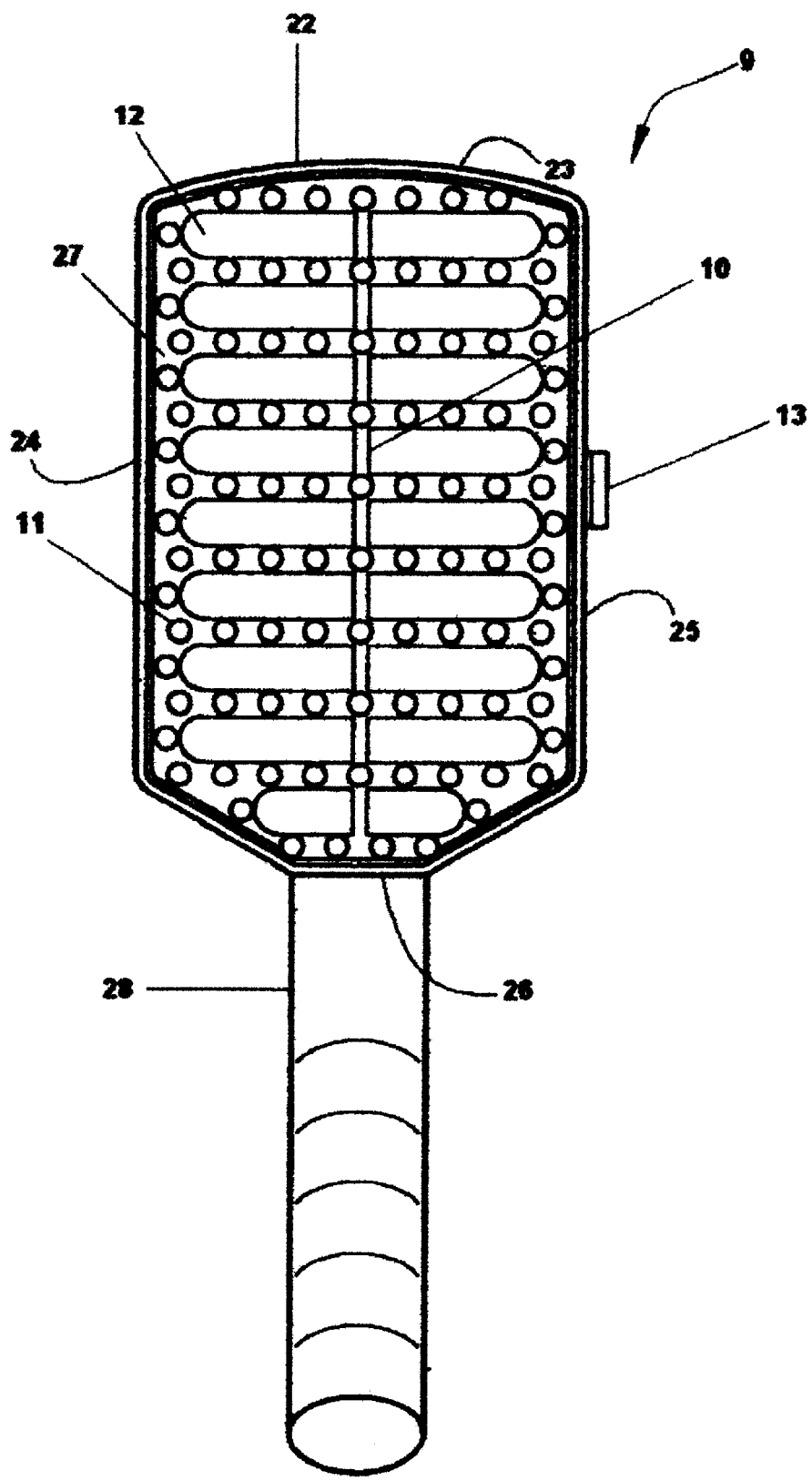
FIG. 1 is a bottom view of a first embodiment of the Catch'em Flea Brush of the present invention.
Figure 2:
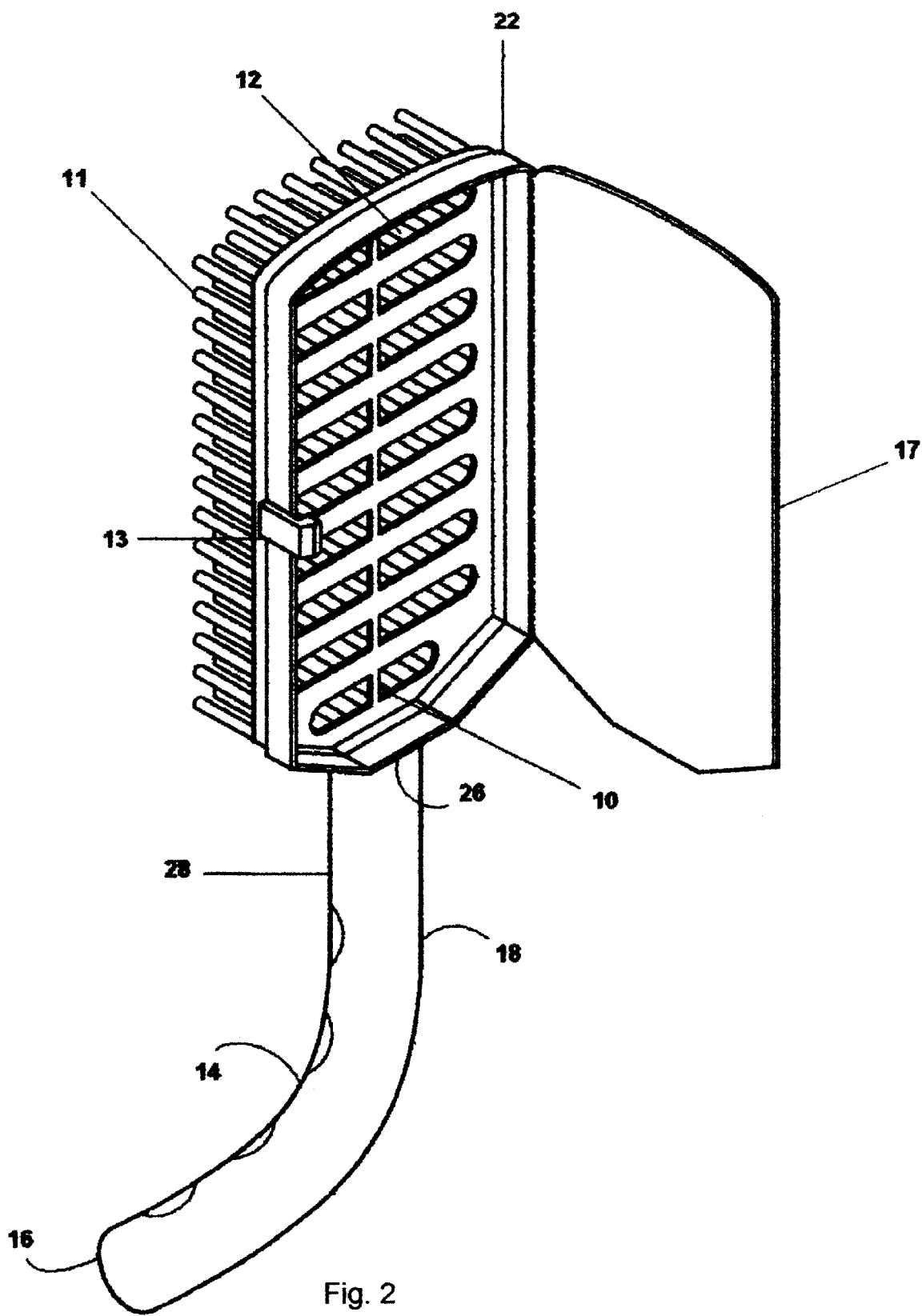
FIG. 2 is a top view of the first embodiment of FIG. 1 of the present invention.
Figure 3:
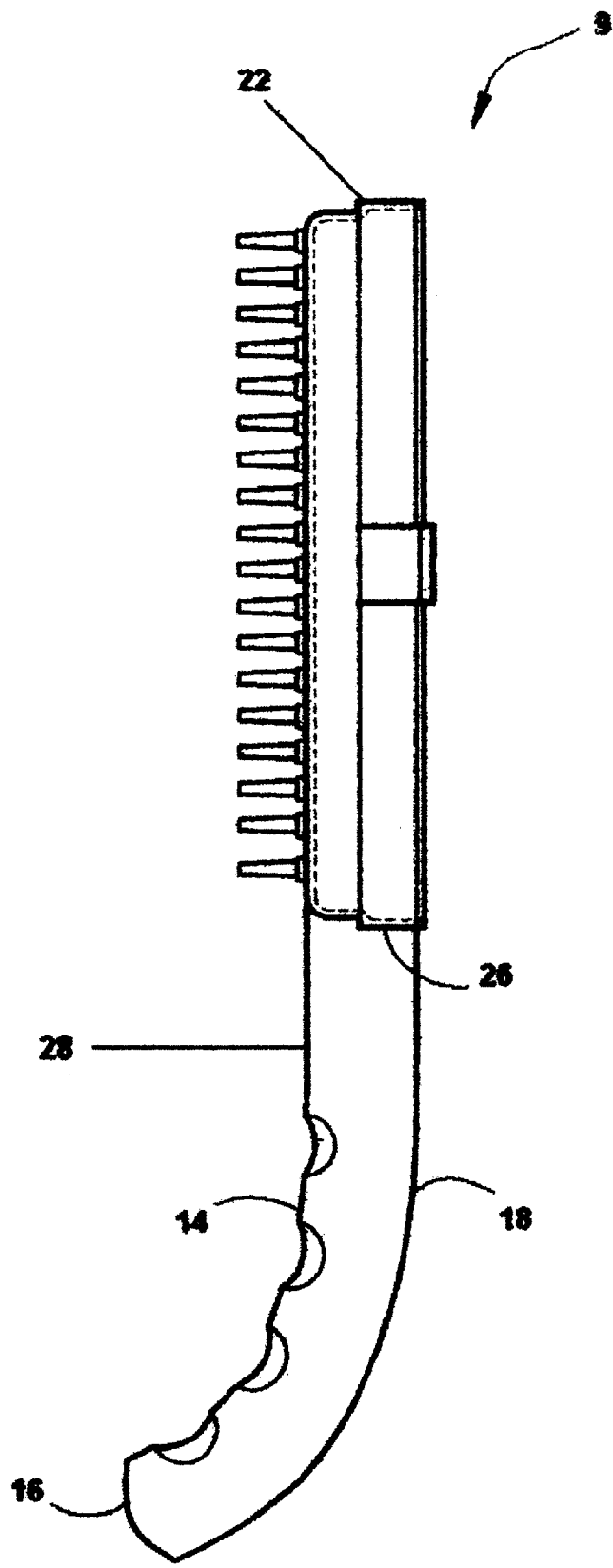
FIG. 3 is a vertical side view of the brush handle and head, with bristles and snap.
Figure 4:
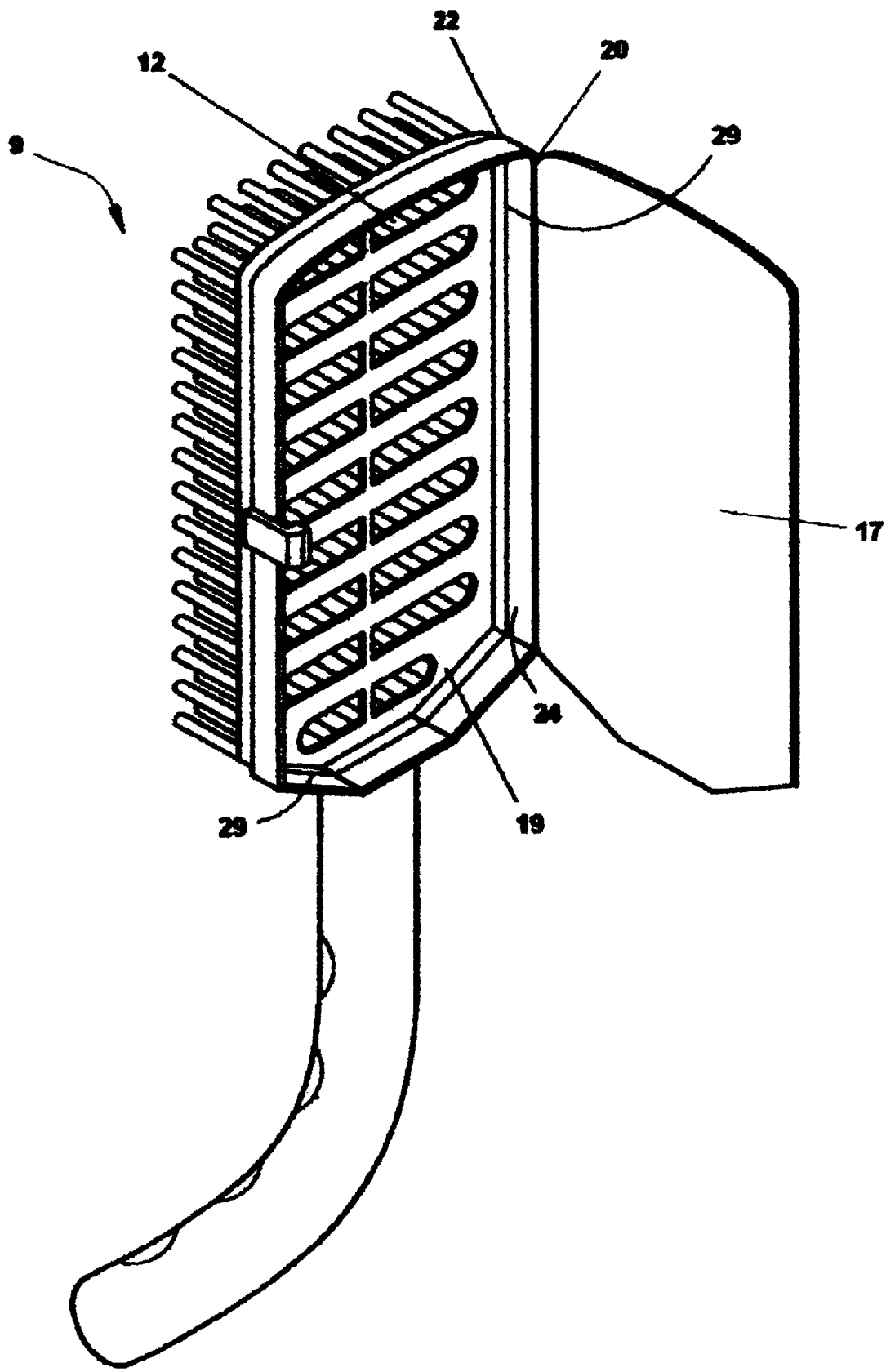
FIG. 4 is a top view of the Catch'em Flea Brush with hollow head, slots, top with living hinge, bristles, and handle.
Figure 5:
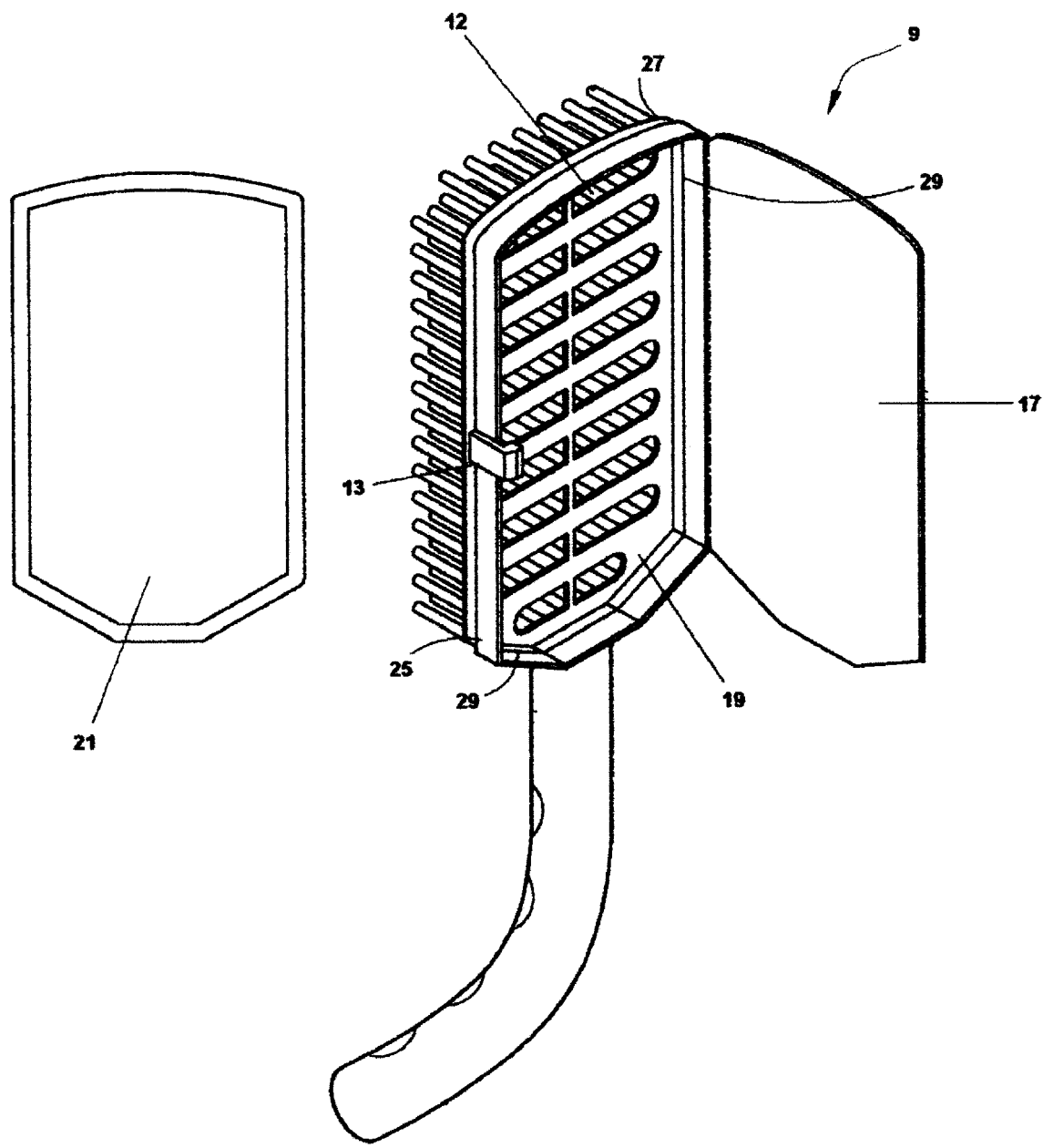
FIG. 5 is a top plan view showing the brush head, top open, slots, ridges, and sticky paper removed.

Directing attention to FIGS. 1–5 a brush 9 is shown, having a handle 28 and a head 22. A hollow head is generally defined by a bottom 27, a first side 23, a second side 24, a third side 25, a fourth side 26 with which said handle 28 is integrally formed, and a top 17.

The head is further composed of a snap 13, bridges 10, slots 12, and bristles 11. The handle composed of a side 26, of said handle 28 having a curve 14, circular 16, and flat 18 with a head 22. A handle 28, to be grasped by a hand of a person.

A head 22 that is hollow with four sides with side 26 said handle 28 that is flat 18, curve 14, circular 16.

The top 17 of the brush Is attached to the head 22 by a living hinge 20 running continuously along the length of the second side 24 of the head. When the top is open the slots 12 are exposed, ridges 29, running continuously along said four sides proximity to hollow 19, with said sticky paper 21 without touching said bottom 27. The top 17 may be closed and secured at the third side 25 of the head by a snap 13.

To use the Catch'em Flea Brush only a few simple steps are required. Open the top 17 by holding brush head in hand and pushing up. Remove protected cover, sticky paper 21, insert inside hollow 19 said four sides onto said ridges 29, close the top and snap fastens and brush the animal freely. As the brush is moved over fur or hair the fleas or insects began to rise from the skin into the head 22 of brush. The sticky paper 21 may be easily removed when filled with fleas or insects and replaced with a fresh one.

The present invention can be produced out of standard materials and processes; it could be molded from durable plastic such as polycarbonate or polypropylene, it could be produced through a standard operation to be completed by the manufacture.

What I claim as my invention is:

1. A flea brush head comprising:

a) a hollow head with said bottom having said four sides;

b) a said bottom having said bridges;

c) a said bottom having said slots;
d) a multitude of bristles projecting downward from said head;
e) a snap affixed to a first side of said head;
f) a living hinge running continuously along the length of second side of said head;
g) a said top attached to said second side to said living hinge of said head;
h) ridges running continuously along the interior of the side four side to create a hollow to insert sticky paper.

2. The Catch'em Flea Brush of claim 1 wherein said bottom of said multitude of bristles each having a bottom end; the bottom end being attached to said head along said bridges.

* * * * *